US009940313B2

(12) United States Patent
Bastide et al.

(10) Patent No.: US 9,940,313 B2
(45) Date of Patent: Apr. 10, 2018

(54) DISPLAYING AT LEAST ONE CATEGORIZED MESSAGE

(71) Applicant: International Business Machines Corporation, Armonk, NY (US)

(72) Inventors: Paul R. Bastide, Boxford, MA (US); Andrew E. Davis, Arlington, MA (US); Mary E. Miller, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/150,093

(22) Filed: May 9, 2016

(65) Prior Publication Data

US 2016/0328364 A1 Nov. 10, 2016

Related U.S. Application Data

(63) Continuation of application No. 14/704,352, filed on May 5, 2015.

(51) Int. Cl.
*G06F 3/00* (2006.01)
*G06F 17/22* (2006.01)
(Continued)

(52) U.S. Cl.
CPC ....... *G06F 17/2264* (2013.01); *G06Q 10/107* (2013.01); *H04L 51/04* (2013.01); *H04L 51/12* (2013.01); *H04L 51/22* (2013.01)

(58) Field of Classification Search
CPC .... G06Q 10/107; G06Q 10/10; H04L 12/585; H04L 12/5855; H04L 12/5895;
(Continued)

(56) References Cited

U.S. PATENT DOCUMENTS 8,539,361 B2 9/2013 Hardy et al.
2003/0105827 A1* 6/2003 Tan .................... G06Q 10/107
709/206
(Continued)

FOREIGN PATENT DOCUMENTS

WO WO 2012/119531 * 9/2012

OTHER PUBLICATIONS

Strasburger; Unfocussed Spatial Attention Underlies the Crowding Effect in Indirect Form Vision; Journal of Vision; Dec. 2005; vol. 5; pp. 1024-1037.
(Continued)

*Primary Examiner* — Kyle Stork
(74) *Attorney, Agent, or Firm* — Fabian VanCott; Steven L. Nichols

(57) ABSTRACT

Displaying categorized messages includes categorizing at least one message into at least one category among a plurality of categories, displaying a number of messages in a dedicated portion of a display, the number of messages displayed being based on a current size of the dedicated portion of the display, wherein a specific message is selected for display based on a priority measure corresponding to the at least one category into which that specific message is categorized, and in response to a resizing of the dedicated portion of the display, selecting again a new number of messages to display in the dedicated portion based on a new size of the dedicated portion, and displaying the new number of messages, wherein a specific message is selected for display based on a priority measure corresponding to the at least one category into which that specific message is categorized.

19 Claims, 7 Drawing Sheets

(51) Int. Cl.
*H04L 12/58* (2006.01)
*G06Q 10/10* (2012.01)

(58) Field of Classification Search
CPC ......... H04L 51/14; H04L 51/22; H04L 51/12; H04L 51/04; G06F 17/212; G06F 17/2264
See application file for complete search history.

(56) References Cited

U.S. PATENT DOCUMENTS

| | | | | |
|---|---|---|---|---|
| 2004/0250131 | A1* | 12/2004 | Swander | H04L 63/0263 726/11 |
| 2005/0267944 | A1 | 12/2005 | Little | |
| 2007/0264956 | A1* | 11/2007 | Bicker | G06Q 10/10 455/186.1 |
| 2009/0113246 | A1* | 4/2009 | Sabato | G06F 11/0769 714/37 |
| 2009/0313346 | A1 | 12/2009 | Sood | |
| 2013/0150099 | A1 | 6/2013 | Chen et al. | |
| 2013/0174082 | A1* | 7/2013 | Khandker | G06F 3/0485 715/780 |
| 2015/0177970 | A1* | 6/2015 | Choi | H04L 12/1895 715/752 |
| 2016/0004395 | A1 | 1/2016 | Voss | |
| 2016/0203586 | A1* | 7/2016 | Chang | G06K 9/48 382/260 |

OTHER PUBLICATIONS

Marois et al; Capacity Limits of Information Processing in the Brain; TRENDS in Cognitive Sciences; vol. 9 No. 6; Jun. 2005; pp. 296-305.

Alvarez et al; How Many Objects can you Track?: Evidence for a resource-limited attentive tracking mechanism; Journal of Vision; Mar. 2007; vol. 1; pp. 1-10.

Wikipedia; Deep Learning; http://en.wikipedia.org/wiki/Deep_Learning; pp. 1-13; May 2015.

Marketing Pilgrim; Facebook Looks to Improve News Feed Content Quality; http://www.marketingpilgrim.com/2013/08/facebook-looks-to-improve-news-feed-content-quality.html; Aug. 2013; pp. 1-4.

Slashdot; Facebook Launches Advanced AI Effort to Find Meaning in your Posts; http://tech.slashdot.org/story/13/09/21/1831239/facebook-launches-advanced-ai-effort-to-find-meaning-in-your-posts; Sep. 2013; p. 1.

* cited by examiner

DISPLAYING AT LEAST ONE CATEGORIZED MESSAGE

BACKGROUND

The present invention relates to displaying at least one categorized message, and more specifically, to displaying at least one categorized message in a dedicated portion of a display.

Messages such as electronic mail (email), instant messages (IM), and text messages may be used to allow a number of users to communicate with each other. The messages may include text, images, and audio. Further, the messages may be displayed via a display of a device. The display may display the messages and information associated with the messages. The information associated with the messages may include subjects of the messages, senders of the messages, other information associated with the messages, or a combination thereof.

BRIEF SUMMARY

A method for displaying categorized messages includes categorizing at least one message into at least one category among a plurality of categories, displaying a number of messages in a dedicated portion of a display, the number of messages displayed being based on a current size of the dedicated portion of the display, wherein a specific message is selected for display based on a priority measure corresponding to the at least one category into which that specific message is categorized, and in response to a resizing of the dedicated portion of the display, selecting again a new number of messages to display in the dedicated portion based on a new size of the dedicated portion, and displaying the new number of messages, wherein a specific message is selected for display based on a priority measure corresponding to the at least one category into which that specific message is categorized.

A system for displaying at least one categorized message includes a processor, memory, communicatively connected to the processor, a display, communicatively connected to the processor, and a message displaying system including a categorizing module to categorize at least one message into at least one category among a plurality of categories, a prioritizing module to prioritize each category in the plurality of categories, a displaying module to display a number of messages in a dedicated portion of the display, the number of messages displayed being based on a current size of the dedicated portion of the display, wherein a specific message is selected for display based on a priority measure corresponding to the at least one category into which that specific message is categorized, and a selecting again module, to select again, in response to a resizing of the dedicated portion of the display, a new number of messages to display in the dedicated portion based on a new size of the dedicated portion, and displaying the new number of messages, wherein a specific message is selected for display based on a priority measure corresponding to the at least one category into which that specific message is categorized.

A computer program product to display categorized messages includes a non-transitory tangible computer readable storage medium, the tangible computer readable storage medium includes computer readable program code embodied therewith, the computer readable program code includes program instructions that, when executed, cause a processor to categorize at least one message into at least one category among a plurality of categories, prioritize each category in the plurality of categories, display a number of messages in a dedicated portion of a display for displaying messages, the number of messages displayed being based on a current size of the dedicated portion of the display, wherein a specific message is selected for display based on a priority measure corresponding to the at least one category into which that specific message is categorized, receive a notice indicating a change of size in the dedicated portion of the display, and in response to a change of size of the dedicated portion of the display, select again a new number of messages to display in the dedicated portion based on a new size of the dedicated portion, and display the new number of messages, wherein a specific message is selected for display based on a priority measure corresponding to the at least one category into which that specific message is categorized.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1A:
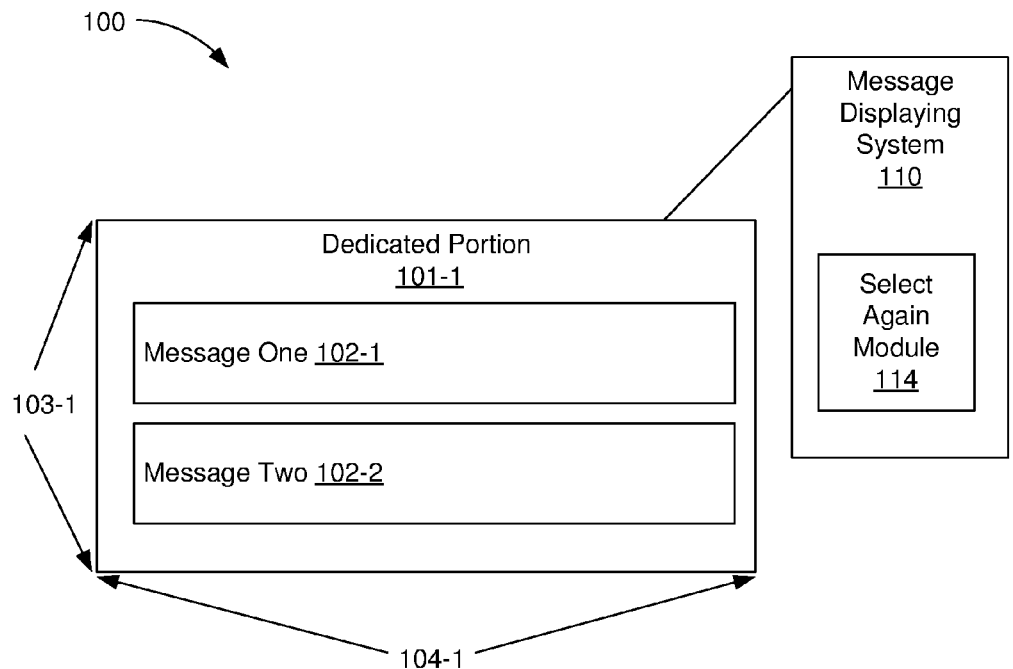
FIG. 1A is a diagram of a system for displaying categorized messages, according to one example of the principles described herein.

The present specification describes a method and system for displaying at least one categorized message in a dedicated portion of a display, such that a new number of messages are selected for displaying purposes when the dedicated portion of the display is resized.

The present invention may be a system, a method, and/or a computer program product. The computer program product may include a computer readable storage medium (or media), having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or blocks or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, messages may be displayed via a display of a device. The display or a portion of the display may display the messages and information associated with the messages. Further, the display may be defined by dimensions such as a height and a width. The height and width of the display may depend on the type of device. A device such as a smartphone may have a small display when compared to a device such as a laptop.

Often, a user receives several messages during the day. Due to the physical constraints of the display or the portion of the display, the number of messages displayed, once received, may be limited to a specific number of messages at any given time. As a result, with an increased number of messages that are received, some of the messages may or may not be displayed at any given time depending on the physical constraints of the display. This makes it difficult for a user to focus on important messages since these important messages may or may not be displayed.

The principles described herein include a system and method for displaying at least one categorized message. Such as method includes categorizing at least one message into at least one category among a plurality of categories, displaying a number of messages in a dedicated portion of a display, the number of messages displayed being based on a current size of the dedicated portion of the display, wherein a specific message is selected for display based on a priority measure corresponding to the at least one category into which that specific message is categorized, and in response to a resizing of the dedicated portion of the display, selecting again a new number of messages to display in the dedicated portion based on a new size of the dedicated portion, and displaying the new number of messages, wherein a specific message is selected for display based on a priority measure corresponding to the at least one category into which that specific message is categorized. Such a method and system allows a new set of messages to be selected for the display when the dedicated portion of the display is resized. As a result, a user can focus on messages that are important to the user the when the dedicated portion of the display is resized.

In the present specification and appended claims, the term "message" means an electronic communication sent to a recipient. A message includes electronic mail (email), instant messages (IM), text messages, and digitally recorded voice messages. The digitally recorded voice messages may be transcribed to a text format.

In the present specification and appended claims, the term "display" means an output device that shows text or graphical images to a recipient. A display is used to communicate computer data to a user.

In the present specification and appended claims, the term "dedicated portion" means a section, amount, or piece of a displayed that is used for the purpose of displaying messages. A dedicated portion may include a part of the display or the entire display. Further, a size of the dedicated portion may be based on a current size or a new size.

In the present specification and appended claims, the term "priority measure" means a rating as to the preference of a message for displaying purposes. A priority measure can be expressed as an ordering. A priority measure can also be expressed as a number.

In the present specification and in the appended claims, the term "category" means a class or division of messages regarded as having a particular shared attribute. A message may be associated with a number of categories.

In the present specification and appended claims, the term "categorized message" means a message that has been assigned to a category. The message may be assigned to one category or several categories.

In the present specification and appended claims, the term "resizing" means a change in dimension, such as length and/or width, of a dedicated portion of a display. The resizing may change a current size of the dedicated portion of the display to a new size of the dedicated portion of the display. The resizing may be based on an orientation of a display.

In the present specification and appended claims, the term "message filter" means a mechanism to create a category for a plurality of categories. A message filter may be associated with a creation time, a modification time, a rule type, and a presentation rule.

In the present specification and appended claims, the term "specific message" means a message that has been selected or identified for displaying in a dedication portion of a display. Further, a specific message is a message that will be processed by a system or method.

In the present specification and appended claims, the term "new number of messages" means a new group or second group of messages that is identified for display purposes once a dedicated portion of a display has been resized. The new number of messages may be based on a new size of a dedicated portion of a display.

As used in the present specification and in the appended claims, the term "a number of" or similar language includes any positive number, including one to infinity; zero not being a number, but the absence of a number.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1A is a diagram of a system for displaying messages. As will be described below, a message displaying system is in communication with a display. The message displaying system displays a number of messages in a dedicated portion of a display. The messages selected for display are selected based on a priority measure corresponding to at least one category into which the messages are categorized. When the dedicated portion is resized, a select again module selects a new number of messages for display based on a priority measure corresponding to the at least one category into which each message is categorized.

As illustrated, the dedicated portion (101-1) of a display is defined by a size such as a dimension. The size of the dedicated portion (101-1) of the display includes a height (103-1) and a width (104-1). The dedicated portion (101-1) may consume an entire display or may consume a portion of the display. For example, the dedicated portion (101-1) may be the entire display of a portable device, such as a cellular telephone or a tablet computing device. Additional information may be displayed in the dedicated portion (101-1) to allow a user to send messages, receive messages, or perform other activities on the device.

The dedicated portion (101-1) of the display may display a number of messages (102-1, and 102-2). As illustrated, the dedicated portion (101-1) of the displays message one (102-1) and message two (102-2). A font size may be specified for each of the messages (102-1, and 102-2). The font size and the size of the dedicated portion (101-1) determine how many messages can be displayed. A smaller font size allows more messages (102) to be displayed in the dedicated portion (101-1) of the display. However, a font size that is too small makes a message (102) more difficult for a user to read. Alternatively, a font size that is too large reduces the number of messages (102) displayed in the dedicated portion (101-1) of the display.

As illustrated, the system (100) includes a message displaying system (110). The message displaying system (110) displays a number of messages in the dedicated portion (101-1). The messages are selected based on the current size of the dedicated portion (101-1). The messages (102-1 and 102-2) are selected from a number of messages. The messages (102-1 and 102-2) are categorized in a number of categories. Further, the categories are prioritized as priority measures. Each message is selected for displaying based on a priority measure corresponding to the categories in which the message is categorized. As illustrated, message one (102-1) and message two (102-2) are selected for display due to their priority measure.

The dedicated portion (101-1) may be resized by changing the height (103-1) or width (104-1) of the dedicated portion. As will be described in FIG. 1B, when the dedicated portion (101-1) changes sizes by, for example, rotating the orientation of the display, the dedicated portion (101-1) changes height (103-1) and width (104-1), and the message displaying system (110) selects a new number of messages to display in the dedicated portion (101-1) of a display via a select again module (114). A message is selected as a specific message from the new number of messages based on a priority measure that corresponds to the categories associated with the specific message. The new messages displayed allow the user to focus on the messages that are associated with categories the user has indicated are important.

Figure 1B:
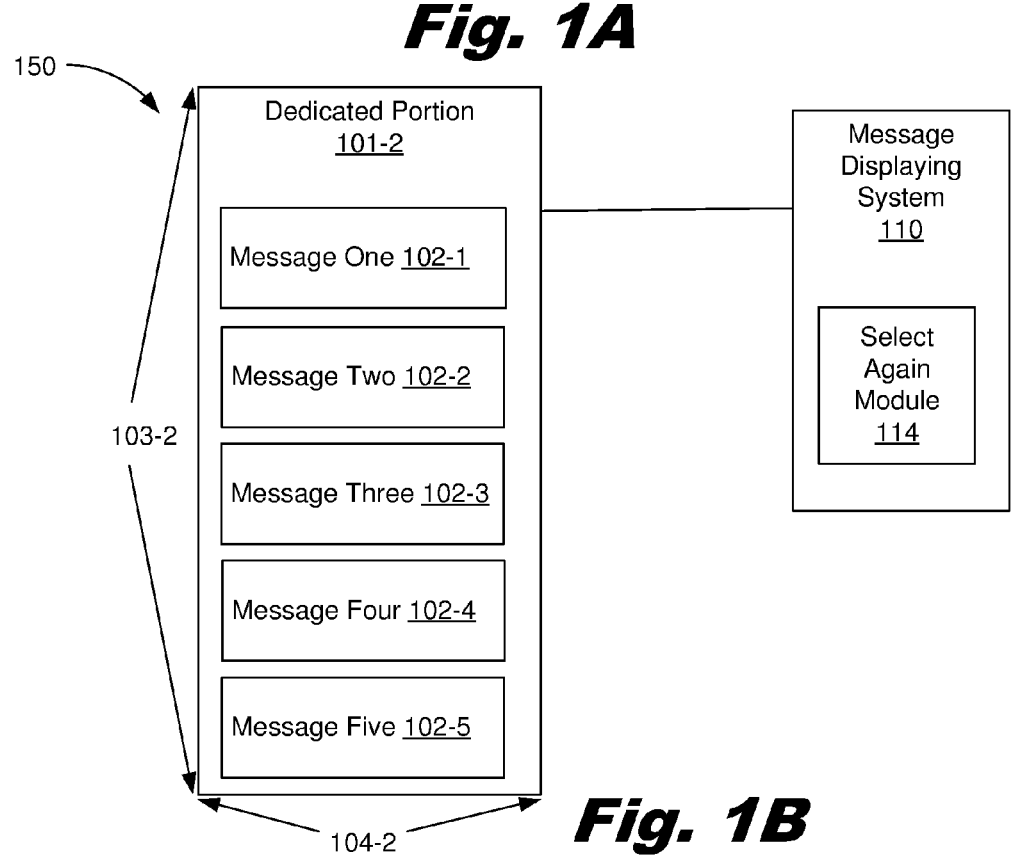
FIG. 1B is a diagram of a system for displaying categorized messages, according to one example of the principles described herein.

Turning specifically to FIG. 1B. FIG. 1B represents the system (100) of FIG. 1A after a resizing of the dedicated portion (101) has taken place. As will be described below, the height (103-2) and the width (104-2) associated with the dedicated portion (101-2) differs from the height (FIG. 1A, 103-1) and width (FIG. 1A, 104-1) of the dedicated portion (FIG. 1A, 101-1) in FIG. 1A. The change in height (103-2) and width (104-2) represents a resizing of the dedicated portion (101) of the display.

Although not illustrated, the display represents a physical device allowing a user to view a number of messages. A mobile device, such as a cellular telephone, may have a system to rotate the display when the device is rotated, so that the display appears to be upright to the user. The rotation of the display rotates the orientation of the dedicated portion (101) of the display. A rotation of the device ninety degrees may cause the height (FIG. 1A, 103-1) of the dedicated portion (101) to change. The width (FIG. 1A, 104-1) of the dedicated portion becomes the height (104-2). The height (FIG. 1A, 103-1) of the dedicated portion becomes the width (103-2). This resizes the dedicated portion (101-2).

A font size may be selected for displaying messages. A messaging interface may be designed so that a message may consume a number of lines of text. For example, a messaging interface is designed to consume two lines of text using twelve point font for each message displayed. The height (103) of the dedicated portion (101) of the display determines the number of messages (102) that are displayed. When the height (103) increases the number of messages that are displayed increases. When the height (103) decreases the number of messages that are displayed decreases. The select again module (114) in the message displaying system (110) selects which messages (102) will be displayed after the dedicated portion (101) of the display is resized.

As illustrated in FIG. 1B, the height (103-2) has increased from the height (FIG. 1A, 103-1) of FIG. 1A. The change in height (103-2) causes the select again module (114) in the message displaying system (110) to select a new number of messages to display in the dedicated portion based on a new size of the dedicated portion (101-2) and display the new number of message. The select again module (114) selects message one (102-1), message two (102-2), message three (102-3), message four (102-4), and message five (102-5) for display in the dedicated portion (101-2). These specific messages are selected for display based on a priority measure corresponding to at least one category into which these specific messages are categorized. As a result, the select again module (114) selects messages for display that are important to a user.

Figure 2:
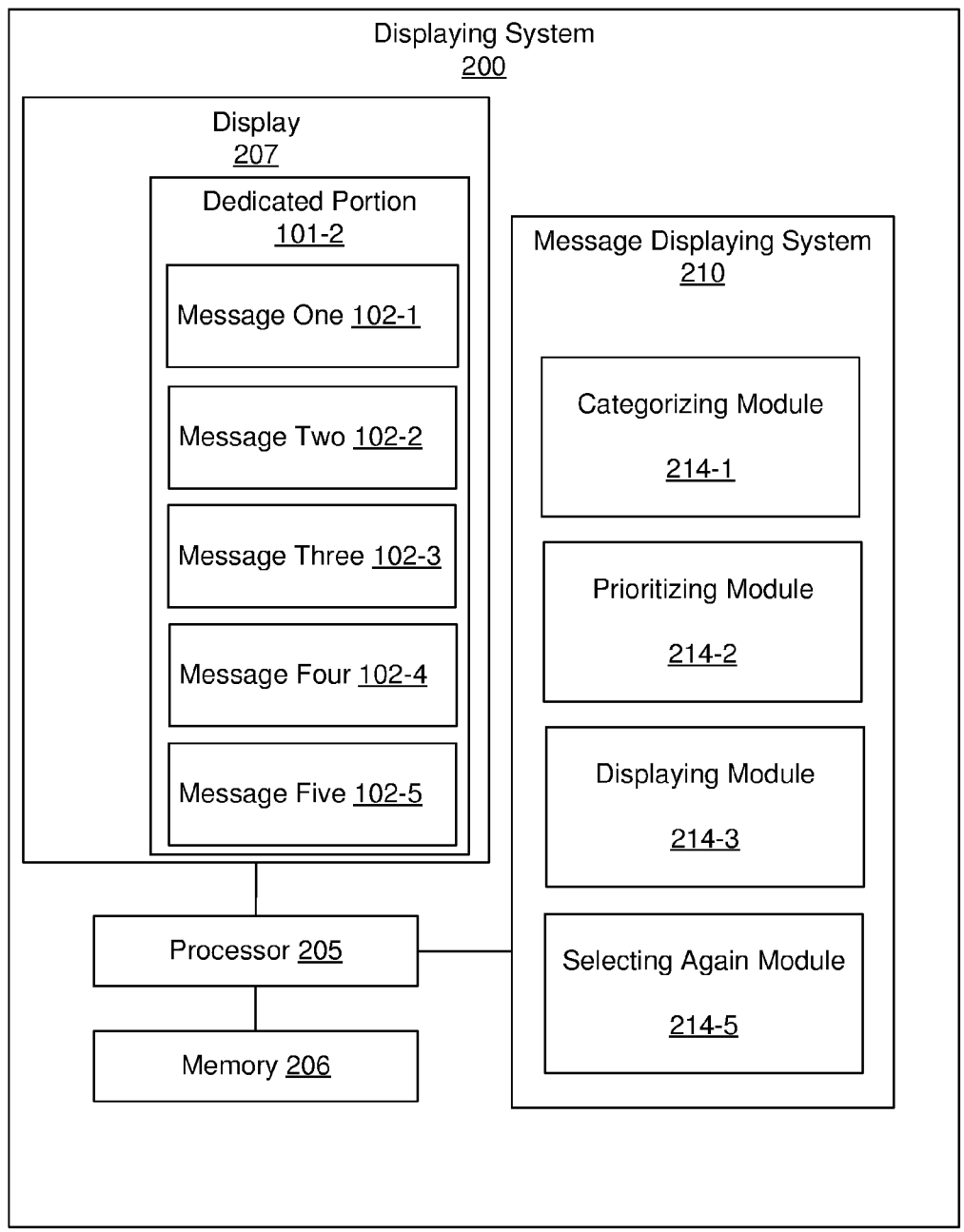
FIG. 2 is a diagram of a system for displaying categorized messages, according to one example of the principles described herein.

FIG. 2 is a diagram of an example of a system for displaying a number of messages, according to one example of the principles described herein. As will be described below, a message displaying system includes a number of modules. A categorize module of the message displaying system categorizes a number of messages into a number of categories. A prioritize module of the message displaying system prioritizes the number of categories. A display module of the message displaying system displays a number of messages in a display portion. A select again module of the message displaying system selects, in response to resizing a display portion, a new number of messages to display.

As illustrated in FIG. 2, the displaying system (200) includes a display (207). The display (207) includes a dedicated portion (101-2). The dedicated portion (101-2) of the display (207) may display a number of messages (102) as described above. The number of messages may include message one (102-1), message two (102-2), message three (102-3), message four (102-4), and message five (102-5).

The display system (200) further includes a processor (205). The processor (205) is communicatively connected to the display (207). Further, the display system (200) includes memory (206) communicatively connected to the processor (205). The processor (205) is communicatively connected to a message displaying system (210). Computer program code from the message displaying system (210), when executed by the (205) processor, cause the processor (205) to perform designated tasks. The computer program code (210) may be stored in the memory (206). The processor (205) uses the memory (206) to store data. The designated tasks include displaying a number of messages (102) in the dedicated portion (101) of the display (207).

As illustrated, the displaying system (200) includes a message displaying system (210). The message displaying system (210) includes a number of modules (214). The modules (214) refer to a combination of hardware and program instructions to perform a designated function. Each of the modules (214) may include a processor and memory. The program instructions are stored in the memory and cause the processor to execute the designated function of the module. As illustrated, the message displaying system (210) includes a categorize module (214-1), a prioritize module (214-2), a display module (214-3), and a select again module (214-5).

The categorize module (214-1) categorizes at least one message into at least one category among a plurality of categories. A message is associated with a number of categories. A category may be associated with a number of messages (102). A message may be categorized when it is delivered to the message displaying system (210). The number of messages (102) may be preserved and categorized together. A message is categorized by applying a message filter associated with a category. As a result, each category is associated with a message filter. Further, a message filter may be associated with a creation time, a modification time, a rule type, and a presentation rule. The message filter may be further based on search criteria. Further, the message filter may be based on facets of search criteria. More information about the message filter will be described in other parts of this specification.

The prioritize module (214-2) prioritizes each category in the plurality of categories. The prioritize module (214-2) may use a priority measure assigned to a category by a user. The prioritize module (214-2) may prioritize by ordering the categories based on attributes associated with a message filter. Further, the message filter is associated with the each of the categories. In one example, the categories are prioritized based on the creation time of the associated message filter. A category that is associated with a message filter that is created first has higher priority measure. In another example, the categories are prioritized based on the modification time of a message filter. A category that is associated with a message filter that has been recently modified is of higher priority measure than a category associated with a message filter that has not been recently modified. In another example, the categories are prioritized based on a priority measure received from a user.

The display module (214-3) displays a number of messages (102) in a dedicated portion (101-2) of the display (207). The number of messages (102) displayed is based on a current size of the dedicated portion (101-2) of the display (207). A specific message is selected for display based on a priority measure corresponding to the at least one category into which that specific message is categorized. The specific message may be selected for display based on the priority measure of a number of categories associated with the specific message. As a result, the specific message may receive benefit from each of the number of categories associated with the specific message.

The select again module (214-5) selects, in response to a resizing of the dedicated portion (101-2) of the display (207), a new number of messages. Although not illustrated, the new number of messages are displayed in the dedicated portion (101-2) based on a new size of the dedicated portion (101-2) as described above. As a result, the select again module (214-5) displays the new number of messages in the dedicated portion (101-2) of the display (207). A specific message in the new number of messages is selected for display based on a priority measure corresponding to the at least one category into which that specific message was categorized. The select again module (214-5) may select more messages to display than previously displayed, fewer messages to display than previously displayed, or the same number of messages to display as previously displayed, depending on the new size of the dedicated portion (101-2).

An overall example of FIG. 2 will now be described. A display portion (101-2) is sized as described in FIG. 1B.

The categorizing module (214-1) categorizes a number of messages (102). Each message (102) is categorized into a number of categories. The prioritizing module (214-2) prioritizes the number of categories. The displaying module (214-3) displays a number of messages (102) in the dedicated portion (101-2) of a display (207). Specific messages are selected for display based on a priority measure corresponding to the categories associated with the specific messages. As illustrated, message one (102-1), message two (102-2), message three (102-3), message four (102-4), and message five (102-5) are selected for display based on a priority measure corresponding to the associated categories.

The dedicated portion (101-2) of the display (207) is resized. In response to the resizing of the dedicated portion (101-2) of the display (207), the select again module (214-5) selects a new number of messages to display in the dedicated portion (101-2) based on a new size of the dedicated portion (101-2). The resized of the dedicated portion (101-2) of the display can display three messages. The select again module (214-5) displays the new number of messages selected. A specific message in the new number of messages is selected based on a priority measure corresponding to the at least one category into which that specific message is categorized. Although not illustrated, message one (102-1), message two (102-2), and message three (102-3) are selected for display.

Figure 3:
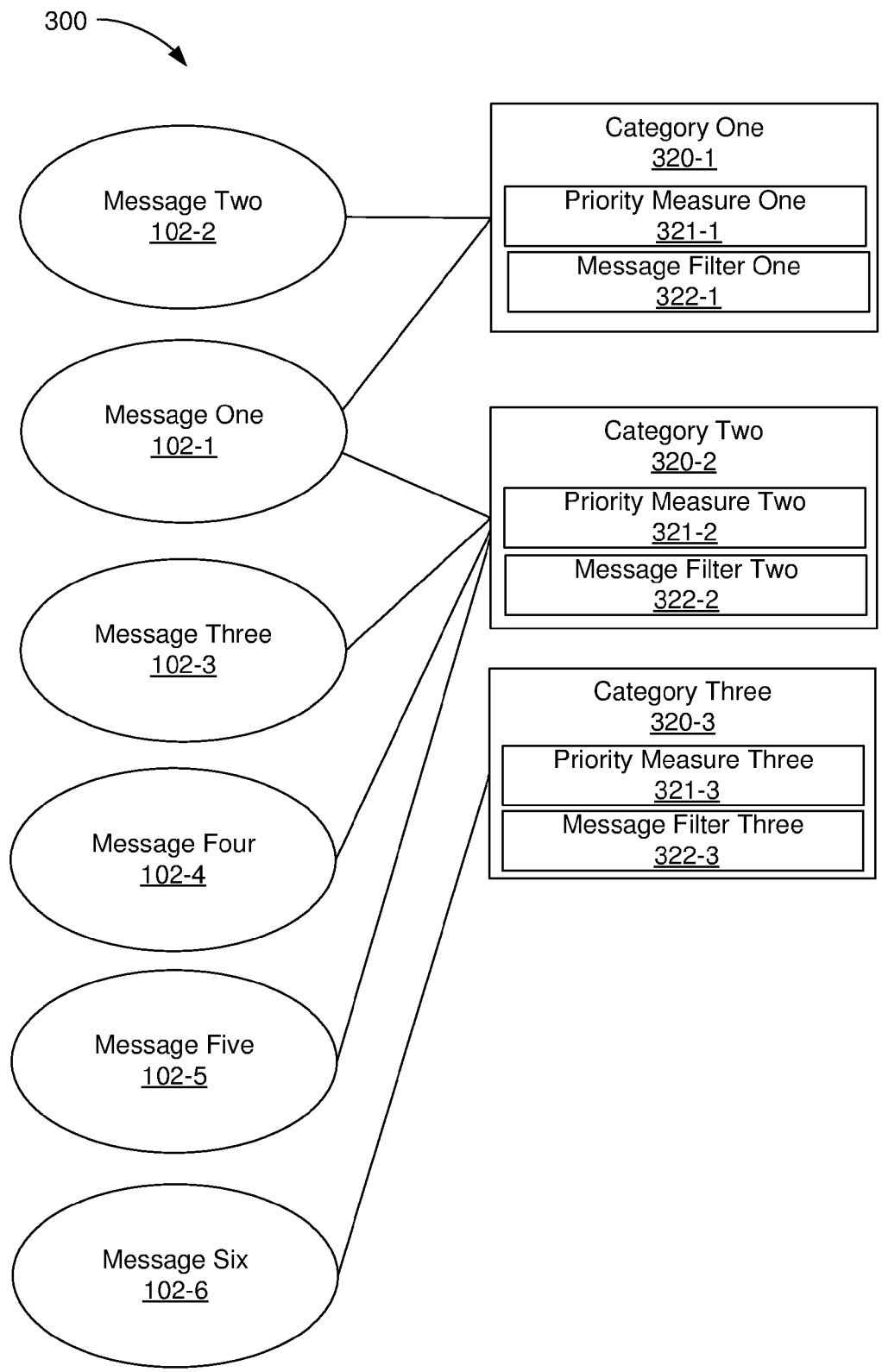
FIG. 3 is a diagram of number of categorized messages that are processed by a message displaying system, according to the principles described herein.

FIG. 3 is a diagram of a number of categorized messages that are processed by a message displaying system. As will be described below, each message is associated with at least one category. Each category contains a priority measure. The messages categorized in a category receive a priority measure corresponding to the categories into which the messages are categorized. Each category contains a message filter. The message filter is applied to the number of messages to categorize the number of messages into the number of categories.

As illustrated, category one (320-1) is associated with priority measure one (321-1) and message filter one (322-1). Message filter one (322-1) is a message filter for a number of messages (102) and is used to associate the number of messages (120) with category one (322-1). A message that meets the criteria of message filter one (322-1) is categorized into category one (320-1). A message categorized in category one (320-1) receives the benefit of priority measure one (321-1). As a result, messages that receive the benefit of priority one (321-1) are displayed in a dedicated portion of a display before other messages that have a lower priority. As illustrated, message one (102-1) and message two (102-2) are categorized into category one (320-1).

Category two (320-2) is associated with priority measure two (321-2) and message filter two (322-2). Message filter two (322-2) is a message filter for the number of messages (102) and is used to associate the number of messages (102) with category two (322-2). A message that meets the criteria of message filter two (322-2) is categorized into category two (320-2). A message categorized in category two (320-2) receives the benefit of priority measure two (321-2). As a result, messages that receive the benefit of priority measure two (321-2) are displayed in a dedicated portion of a display after messages with the benefit of priority measure one (321-1), but before other messages that have a lower priority measure. As illustrated, message one (102-1), message three (102-3), message four (102-4) and message five (102-5) are categorized into category two (320-2).

As illustrated, category three (320-3) is associated with priority measure three (321-3) and message filter three (322-3). Message filter three (322-3) is a message filter for the number of messages (102) and is used to associate the number of messages (102) with category three (322-3). A message that meets the criteria of message filter three (322-3) is categorized into category three (320-3). A message categorized in category three (320-3) receives the benefit of priority three (321-3). As a result, messages that receive the benefit of priority measure three (321-3) are displayed in a dedicated portion of a display after messages with the benefit of priority measure one (321-1) and priority measure two (321-2), but before other messages that have a lower priority measure. As illustrated, message six (102-6) is categorized into category three (320-3).

An overall example of FIG. 3 will now be described with reference to FIG. 3 and the message display system (210) of FIG. 2. As mentioned above, the message displaying system (210) includes the categorizing module (214-1), the prioritizing module (214-2), the displaying module (214-3), and the selecting again module (214-5).

The categorizing module (214-1) categorizes a number of messages (102) into a number of categories (320). The categorizing occurs by applying a number of message filters (322) to the number of messages (102) as described above. Message filter one (322-1) is applied to the number of messages (102) and categorizes message one (102-1) and message two (102-2) into category one (320-1). Message filter two (322-2) is applied to the number of messages (102) and categorizes message one (102-1), message three (102-3), message four (102-4), and message five (102-5) into category two (320-2). Message filter three (322-3) is applied to the number of messages (102) and categorizes message six (102-6) into category three (320-3).

The prioritizing module (214-2) prioritizes the number of categories (320). Category one (320-1) is prioritized to have a first priority as described for priority measure one (322-1). Category two (320-2) is prioritized to have a second priority as described for priority measure two (322-2). Category three (320-3) is prioritized to have a third priority as described for priority measure three (322-3).

The messages (102) are assigned a priority measure based on the categories (320) in which a message (102) is categorized. Message one (102-1) is categorized in both category one (320-1) and category two (320-2). As a result, message one (102-1) receives a priority measure from category one (320-1) and category two (320-2). In this example, message one (102-1) is prioritized above other messages categorized in category one (320-1). Message one (102-1) receives the benefit of both priority measure one (321-1) and priority measure two (321-2). Message two (102-2) receives a priority measure of priority measure one (321-1) from category one (320-1). Message three (102-3), message four (102-4), and message five (102-5) receive a priority measure of priority measure two (321-2) from category two (320-2). Message six (102-6) receives a priority measure of priority measure three (321-3) from category three (320-3).

The displaying module (214-3) displays the number of messages (102) in a current size of a dedicated portion of the display. The messages (102) may be displayed as illustrated in FIG. 1A. As a result, message one (FIG. 1A, 102-1) and message two (FIG. 1A, 102-2) are selected for display and displayed in the dedicated portion of the display.

The dedicated portion of the display may then be resized. The dedicated portion is resized as illustrated in FIG. 1B. The select again module (214-5) selects a new number of the messages (102) to display in the dedicated portion of the display. A specific message is selected for display based on a priority measure corresponding to the at least one category (320) into which that specific message is categorized. Message one (102-1), message two (102-2), message three (102-3), message four (102-4) and message five (102-5) are selected for display. These messages selected for display are displayed in the dedicated portion of the display. Message six (102-6) is not selected for display based on the priority measure of category three (320-3) as compared to category one (320-1) and category two (320-2).

Figure 4:
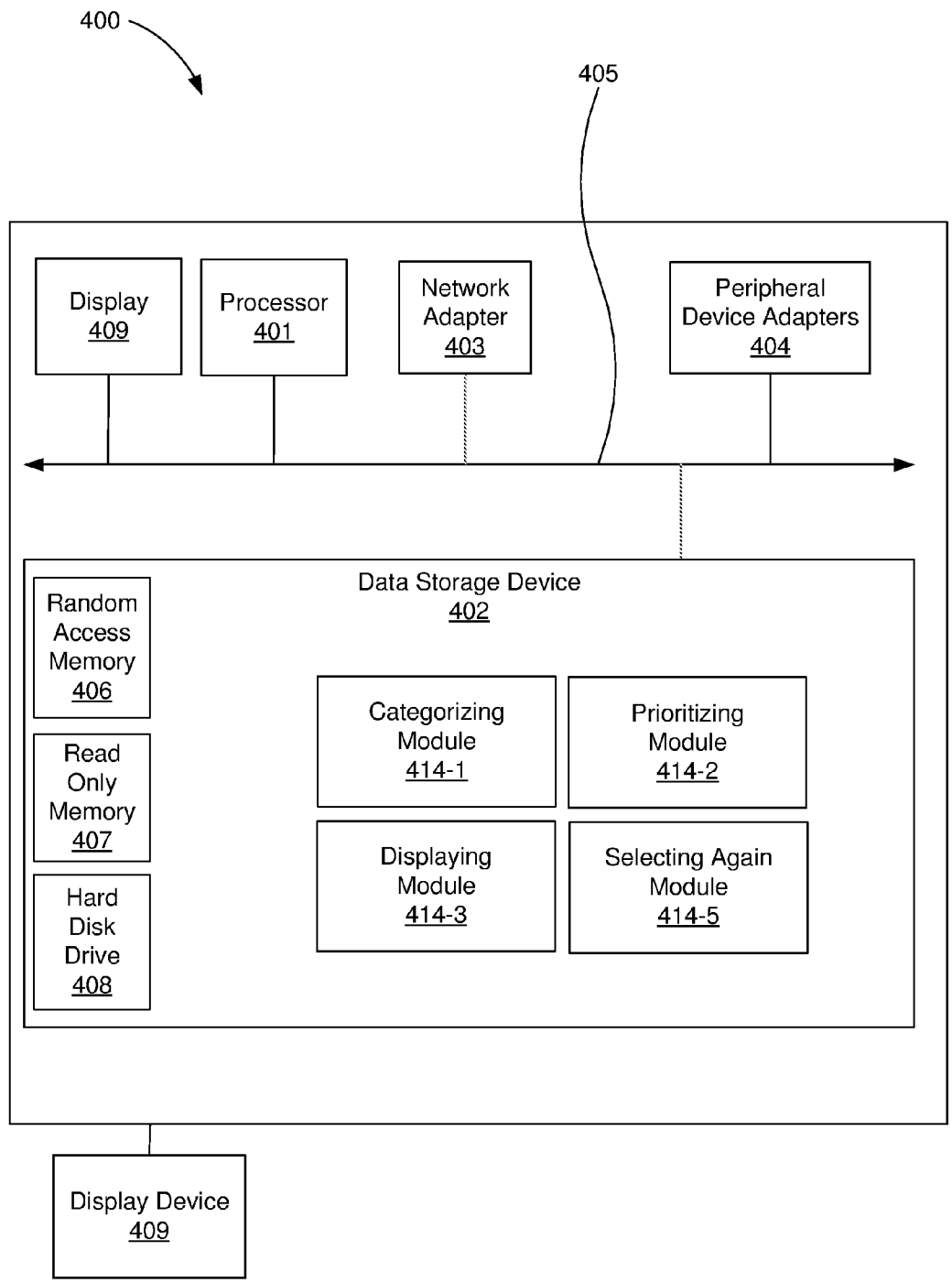
FIG. 4 is a diagram of a computing device for displaying categorized messages, according to the principles described herein.

FIG. 4 is a diagram of a computing device for displaying categorized messages, according to one example of the principles described herein. The computing device (400) for managing data in a distributed computing environment may be implemented in an electronic device. Examples of electronic devices include servers, desktop computers, laptop computers, personal digital assistants (PDAs), mobile devices, smartphones, smart devices, gaming systems, and tablets, among other electronic devices.

The computing device (400) may be utilized in any data-processing scenario, including stand-alone hardware, mobile applications, a computing network, or combinations thereof. Further, the computer (400) may be used in a computing network, a public cloud network, a private cloud network, a hybrid cloud network, other forms of networks, or combinations thereof. In one example, the methods provided by the computing device (400) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (400) are executed by a local administrator.

To achieve its desired functionality, the computing device (400) includes various hardware components. Among these hardware components may be a number of processors (401), a number of data storage devices (402), a number of peripheral device adapters (404), and a number of network adapters (403). These hardware components may be interconnected through the use of a number of buses and/or network connections. In one example, the processor (401), data storage device (402), peripheral device adapters (404), and a network adapter (403) may be communicatively coupled via a bus (405).

The data storage device (402) stores data, such as executable program code, that is executed by the processor (401) or other processing device. As will be discussed, the data storage device (402) may specifically store computer code representing a number of applications that the processor (401) executes to implement at least the functionality described herein.

The data storage device (402) may include various types of memory modules, including volatile and nonvolatile memory. For example, the displaying system (402) of the present example includes Random Access Memory (RAM) (406), Read Only Memory (ROM) (407), and Hard Disk Drive (HDD) memory (408). Many other types of memory may also be utilized, and the present specification contemplates the use of as many varying type(s) of memory in the data storage device (402) as may suit a particular application of the principles described herein. In certain examples, different types of memory in the data storage device (402) may be used for different data storage needs. For example, in certain examples, the processor (401) may boot from Read Only Memory (ROM) (407), maintain nonvolatile storage in the Hard Disk Drive (HDD) memory (408), and execute program code stored in Random Access Memory (RAM) (406).

Generally, the data storage device (402) comprises a computer readable medium, a computer readable storage medium, or a non-transitory computer readable medium, among others. For example, the data storage device (402) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (403, 404) in the computing device (400) enable the processor (401) to interface with various other hardware elements, external and internal to the computing device (400). For example, the peripheral device adapters (404) may provide an interface to input/output devices, such as, for example, a display device (409), a mouse, or a keyboard. The peripheral device adapters (403) may also provide access to other external devices, such as an external storage device, a number of network devices such as, for example, servers, switches, and routers, client devices, other types of computing devices, and combinations thereof.

The display device (409) allows a user of the computing device (400) to interact with and implement the functionality of the computing device (400). The peripheral device adapters (404) may also create an interface between the processor (401) and the display device (409), a printer, or other media output devices. The network adapter (403) may provide an interface to other computing devices within, for example, a network, thereby enabling the transmission of data between the computing device (400) and other devices located within the network.

The computing device (400) may, when executed by the processor (401), display the number of graphical user interfaces (GUIs) on the display device (409) associated with the executable program code, representing the number of applications stored on the data storage device (402). The GUIs may include aspects of the executable code, including displaying a number of messages to a user. When the dedicated portion of the GUI changes size, a new number of messages are selected and displayed. The GUIs may display, for example, a number of messages based on the size of a dedicated portion of a display. Examples of display devices (409) include a computer screen, a laptop screen, a mobile device screen, a personal digital assistant (PDA) screen, and a tablet screen, among other display devices (409). Examples of the GUIs displayed on the display device (409) will be described in more detail below.

The computing device (400) includes a number of modules used in the implementation of the management system for data in a distributed environment. The various modules within the computing device (400) include executable program code that may be executed separately. In this example, the various modules may be stored as separate computer program products. In another example, the various modules within the computing device (400) may be combined within a number of computer program products; each computer program product includes a number of the modules.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (401) of the computing device (400) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The computing device (400) includes a number of modules (414). The modules (414) are made to, when executed by the processor (401), cause the processor (401) to perform a specified function. The modules (414) include a categorizing module (414-1) to categorize a number of messages into a number of categories. The modules (414) include a prioritizing module (414-2) to prioritize the number of categories. The modules (414) include a displaying module (414-3) to display a number of messages (based on the priority measure of the categories. The modules (414) include a select again module (414-5) to select, in response to a resizing of the dedicated portion of the display, a new number of messages to display in the dedicated portion based on a new size of the dedicated portion and display the new number of messages.

The categorizing module (414-1) categorizes at least one message into at least one category among a plurality of categories. Messages may be processed when the messages are received. The messages may be preserved and processed as a group. The messages may be categorized into a number of categories.

The prioritizing module (414-2) prioritizes each category in the plurality of categories. Each category is associated with a message filter. Further, each category may be designed to be associated with a priority measure. Messages associated with a category receive a priority from the priority measure of the category.

The displaying module (414-3) displays a number of messages in a dedicated portion of a display for displaying messages. The number of messages displayed is based on a current size of the dedicated portion of the display. A specific message is selected for display based on a priority measure corresponding to the at least one category into which that specific message is categorized. A specific message receives a priority measure from a number of categories. A specific message is selected for display based on a number of categories associated with that specific message. The priority measure associated with a number of categories indicates that messages associated with the number of category may be selected to be displayed. In one example, the displaying module (414-3) selects messages from a number of categories for display. Messages not associated with the number of categories are not selected for display. The categories associated with messages may indicate that the messages are of increased importance to a user.

The select again module (414-5) selects, in response to a resizing of the dedicated portion of the display, a new number of messages to display in the dedicated portion of the display (FIG. 2, 207). The new number of messages are selected based on the new size of the dedicated portion. The select again module (414-5) displays the new number of messages. A specific message is selected for display based on a priority measure corresponding to the at least one category into which that specific message is categorized.

Figure 5:
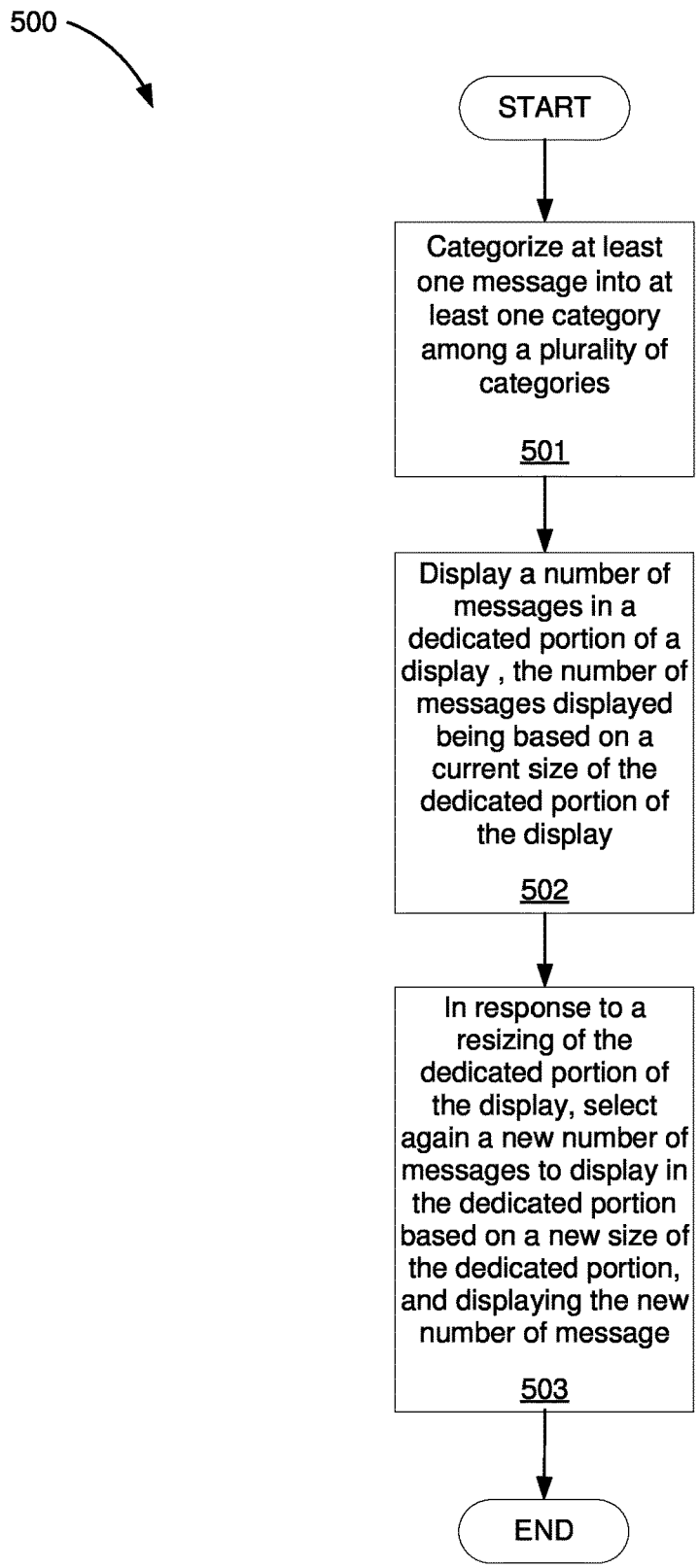
FIG. 5 is a flowchart of a method for displaying categorized messages, according to one example of principles described herein.

FIG. 5 is a flowchart of an example of a method for displaying categorized messages, according to one example of principles described herein. The method (500) may be executed by the message displaying system (100) of FIG. 1A. The method (500) may be executed by other systems (i.e. system 150, system 200, system 300, and system 700). The method (500) includes categorizing (501) at least one message into at least one category among a plurality of categories, displaying (502) a number of messages in a dedicated portion of a display, the number of messages displayed being based on a current size of the dedicated portion of the display, and in response to a resizing of the dedicated portion of the display, selecting (503) again a new number of messages to display on the dedicated portion based on a new size of the dedicated portion and displaying the new number of messages.

As mentioned above, the method (500) includes categorizing (501) at least one message into at least one category among a plurality of categories. Each category in the plurality of categories may be created by applying a message filter associated with the category. Each message filter may contain additional information about the message filter. A message filter may be associated with a creation time, a modification time, a filter type, and a presentation rule. A creation time indicates the time at which a message filter was created. A modification time indicates the last time a message filter was modified. A filter type indicates the type of filter a filter is. The type of filter may include filtering based on a message originator, message recipient, message content, message subject, number of key words, or combinations thereof. A filter may also identify other aspects of a message. A filter type may provide information instructing the application of the message filter.

As mentioned above, the method (500) includes displaying (502) a number of messages in a dedicated portion of a display, the number of messages displayed being based on a current size of the dedicated portion of the display. The number of messages displayed is based on a current size of the dedicated portion of the display. A specific message is selected for display based on a priority measure corresponding to the at least one category into which that specific message is categorized. A specific message is selected for display based on a priority measure. The priority measure is based on the priority measure of a number of categories associated with the specific message. A message is categorized based on a set of rules associated with each category. The set of rules may include a priority measure for each category, a rule for determining when a message is a member of the category, membership rules for the category, when messages may be included in the category. Further, a set of rules associated with a category may indicate that a message may categorized to that category may not receive a priority measure from other categories.

As mentioned above, the method (500) includes, in response to a resizing of the dedicated portion of the display, selecting (503) again a new number of messages to display in the dedicated portion based on a new size of the dedicated portion, and displaying the new number of messages. The resizing of the dedicated portion of the display includes a change in the dimensions of the dedicated portion of the display. The dimensions of the dedicated portion of the display may include a height and/or a width of the dedicated portion of the display. A specific message is selected for display based on a priority measure corresponding to the at least one category into which that specific message is categorized.

Figure 6:
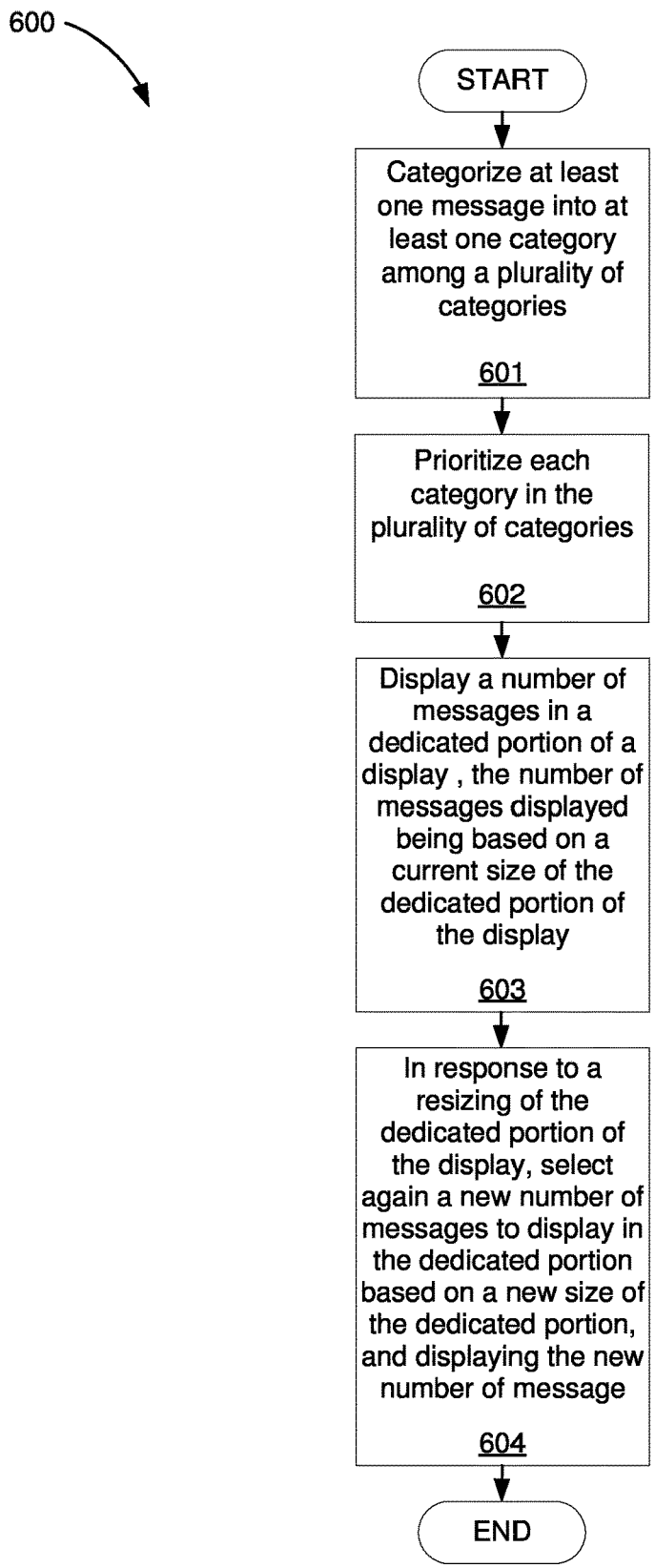
FIG. 6 is a flowchart of a method for displaying categorized messages, according to one example of principles described herein.

FIG. 6 is a flowchart of an example of a method for displaying categorized messages, according to one example of principles described herein. The method (600) may be executed by the identifying system (100) of FIG. 1A. The method (600) may be executed by other systems (i.e. system 150, system 200, system 300, and system 700). The method (600) includes categorizing (601) at least one message into at least one category among a plurality of categories, prioritizing (602) each category in the plurality of categories, displaying (603) a number of messages in a dedicated portion of a display, the number of messages displayed being based on a current size of the dedicated portion of the display, and in response to a resizing of the dedicated portion of the display, selecting (604) again a new number of messages to display on the dedicated portion based on a new size of the dedicated portion and displaying the new number of messages.

As mentioned above, the method (600) includes prioritizing (602) each category in the plurality of categories. The priority measure received by each message corresponds to the at least one category into which that specific message is categorized is based on the priority measure of the plurality of categories.

Figure 7:
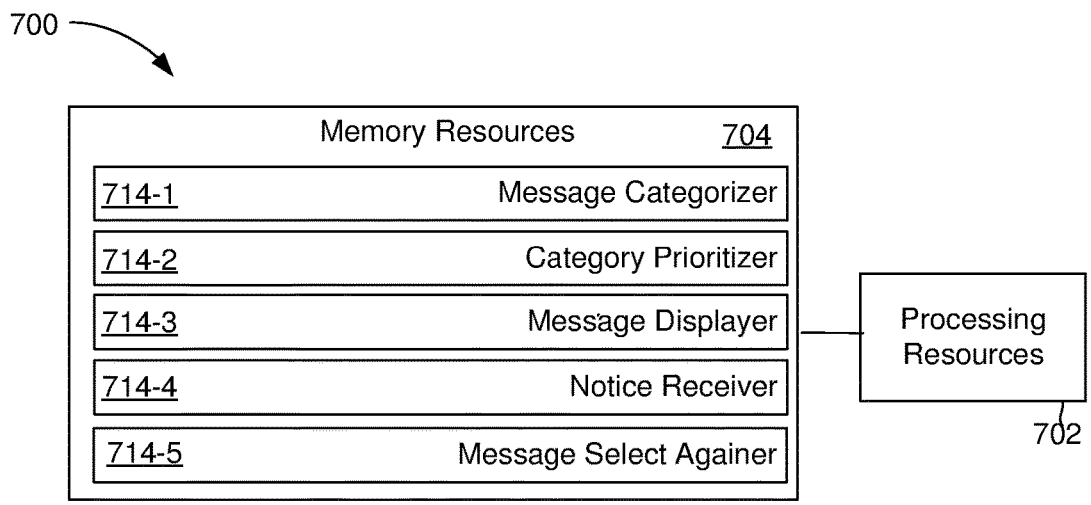
FIG. 7 is a diagram of an example of a message displaying system, according to one example of principles described herein.

FIG. 7 is a diagram of an example of a message displaying system (700), according to the principles described herein. In this example, the message displaying system (700) includes processing resources (702) that are in communication with memory resources (704). Processing resources (702) include at least one processor and other resources used to process programmed instructions. The memory resources (704) generally represent any memory capable of storing data, such as programmed instructions or data structures used by the message displaying system (900). The programmed instructions shown stored in the memory resources (704) include a message categorizer (714-1), a category prioritizer (714-2), a message displayer (714-3), a notice receiver (714-4), and a message select againer (714-5).

The memory resources (704) include a computer readable storage medium that contains computer readable program code to cause tasks to be executed by the processing resources (702). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The message categorizer (714-1) represents programmed instructions that, when executed, cause the processing resource (702) to categorize at least one message into at least one category among a plurality of categories. A message is categorized into a number of categories.

The category prioritizer (714-2) represents programmed instructions that, when executed, cause the processing resource (702) to prioritize each category in the plurality of categories. Information may be associated with the categories to inform the prioritization of the categories.

The message displayer (714-3) represents programmed instructions that, when executed, cause the processing resource (702) to display a number of messages in a dedicated portion of a display for displaying messages. The number of messages displayed is based on a current size of the dedicated portion of the display. A specific message is selected for display based on a priority measure corresponding to the at least one category into which that specific message is categorized.

The notice receiver (714-4) represents programmed instructions that, when executed, cause the processing resource (702) to receive a notice indicating a change of size in the dedicated portion of the display.

The message select againer (714-5) represents programmed instructions that, when executed, cause the processing resource (702) to select, when a notice indicating a change of size in the dedicated portion is received, a new number of messages to display in the dedicated portion based on a new size of the dedicated portion, and display the new number of messages. A specific message is selected for display based on a priority measure corresponding to the at least one category into which that specific message (is categorized.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

What is claimed is:

1. A method for displaying at least one categorized message, the method comprising:
    categorizing at least one message into at least one category among a plurality of categories;
    displaying a number of messages in a dedicated portion of a display, the number of messages displayed being based on a current size of the dedicated portion of the display, wherein a specific message is selected for display based on a priority measure corresponding to the at least one category into which that specific message is categorized, wherein a number of the messages have a priority measure based on multiple categories corresponding to that message; and
    in response to a resizing of the dedicated portion of the display, wherein the resizing comprises a user changing at least one of a height or width of the dedicated portion of the display, selecting again a new number of messages to display in the dedicated portion based on a new size of the dedicated portion, and displaying the new number of messages, wherein a specific message of the new number of messages is selected for display based on again considering a priority measure corresponding to the at least one category into which that specific message is categorized based on a set of rules associated with each category;
    wherein the set of rules associated with a category indicates that at least one of the number of messages categorized into that category does not receive a priority measure from a different category.

2. The method of claim 1, further comprising prioritizing each category in the plurality of categories.

3. The method of claim 2, wherein the priority measure corresponding to the at least one category into which that specific message is categorized is based on the priority measure of the plurality of categories.

4. The method of claim 1, wherein each category in the plurality of categories is created by applying a message filter associated with the category.

5. The method of claim 4, wherein each message filter is associated with a creation time, a modification time, a rule type, and a presentation rule.

6. The method of claim 1, wherein at least one message is categorized into at least two categories, the method further comprising determining a display priority measure for that message based on the priority measures assigned to all of the categories in which that message has been categorized.

7. The method of claim 1, further comprising determining the new number of messages to display in the resized dedicated portion based on an assigned font size in which the messages are to be displayed.

8. The method of claim 1, further comprising a number of message filters, each filter associated with a category of the plurality of categories, each filter comprising criteria that, if met by a message, will cause that message to be categorized in the category corresponding to the that filter.

9. The method of claim 8, wherein the priority measure of a category is determined by a creation time of a filter associated with that category.

10. The method of claim 8, wherein the priority measure of a category is determined by how recently a filter associated with that category has been modified.

11. The method of claim 8, wherein at least one of the message filters comprises one of a rule time, a presentation type and search criteria.

12. The method of claim 1, wherein the resizing comprises a user rotating an orientation of the display.

13. A method for displaying at least one categorized message with a system comprising a processor; memory, communicatively connected to the processor, and a display, communicatively connected to the processor, the method comprising:
    using a number of filters, categorizing at least one message into at least one category among a plurality of categories, each category having a corresponding filter and an assigned priority level, wherein the assigned priority level of a category depends on how recently the corresponding filter was created or modified, such that a category associated with a message filter that has most recently been created or modified has a high priority level than a category associated with a filter created or modified less recently;
    displaying a number of messages in a dedicated portion of the display, the number of messages displayed being based on a current size of the dedicated portion of the display, wherein a specific message is selected for display based on a priority measure corresponding to the priority level of all the categories into which that specific message is categorized;

in response to a resizing of the dedicated portion of the display, determining a new number of messages to display in the dedicated portion based on a new size of the dedicated portion;

reviewing the priority level of the at least one message to determine which messages to display in the resized dedicated portion of the display; and wherein that specific message is categorized based on a set of rules associated with each category and wherein the set of rules associated with each category indicates that at least one of the number of messages categorized into the at least one category does not receive a priority measure from a different category.

14. The method of claim 13, wherein a priority measure of the specific message is based on the priority level of two or more categories to which that specific message is categorized.

15. The method of claim 13, further comprising determining a new number of messages to display in the dedicated portion based on an assigned font size in which the messages are to be displayed.

16. The method of claim 13, each filter comprising criteria, including a message originator, that, if met by a message, will cause that message to be categorized in the category corresponding to the that filter.

17. The method of claim 16, wherein the priority level of a category is determined by a creation time of a filter associated with that category.

18. The method of claim 16, wherein the priority level of a category is determined by how recently a filter associated with that category has been modified.

19. The method of claim 16, each filter comprising criteria, including a message subject, that, if met by a message, will cause that message to be categorized in the category corresponding to the that filter.

* * * * *